United States Patent [19]

Yamanaka et al.

[11] Patent Number: 4,624,792
[45] Date of Patent: Nov. 25, 1986

[54] METHOD FOR TREATING RADIOACTIVE ORGANIC WASTES

[75] Inventors: Akihiro Yamanaka; Masami Toshikuni; Kazunori Suzuki, all of Yokohama, Japan

[73] Assignee: JGC Corporation, Tokyo, Japan

[21] Appl. No.: 560,370

[22] Filed: Dec. 12, 1983

[51] Int. Cl.⁴ .............................................. C02F 1/72
[52] U.S. Cl. ................................. 210/759; 210/763; 210/908; 252/631
[58] Field of Search .............. 210/759, 668, 760, 748, 210/908, 912, 682, 763; 252/625, 626, 631

[56] References Cited

U.S. PATENT DOCUMENTS

| | | | |
|---|---|---|---|
| 3,716,566 | 2/1973 | Sansoni et al. | 210/759 |
| 4,321,143 | 3/1982 | Wilms et al. | 210/759 |
| 4,437,999 | 3/1984 | Mayne | 210/760 |

FOREIGN PATENT DOCUMENTS

| | | | |
|---|---|---|---|
| 54-47357 | 4/1979 | Japan | 210/759 |
| 58-34080 | 2/1983 | Japan | 210/759 |
| 58-52599 | 3/1983 | Japan | 210/759 |

*Primary Examiner*—Benoit Castel
*Attorney, Agent, or Firm*—Armstrong, Nikaido, Marmelstein & Kubovcik

[57] ABSTRACT

Radioactive organic wastes such as anion-exchange resins, chelate resins and organic filter sludges are readily oxidized by reacting hydrozen peroxide in an aqueous medium in the presence of iron-ions or both iron-ions and cation-exchange resin to be decomposed to carbon dioxide and water. Contact between the wastes to be decomposed and hydrogen peroxide is preferably conducted by continuously feeding hydrogen peroxide or both hydrogen peroxide and the wastes to be decomposed to the reaction zone.

6 Claims, 1 Drawing Figure

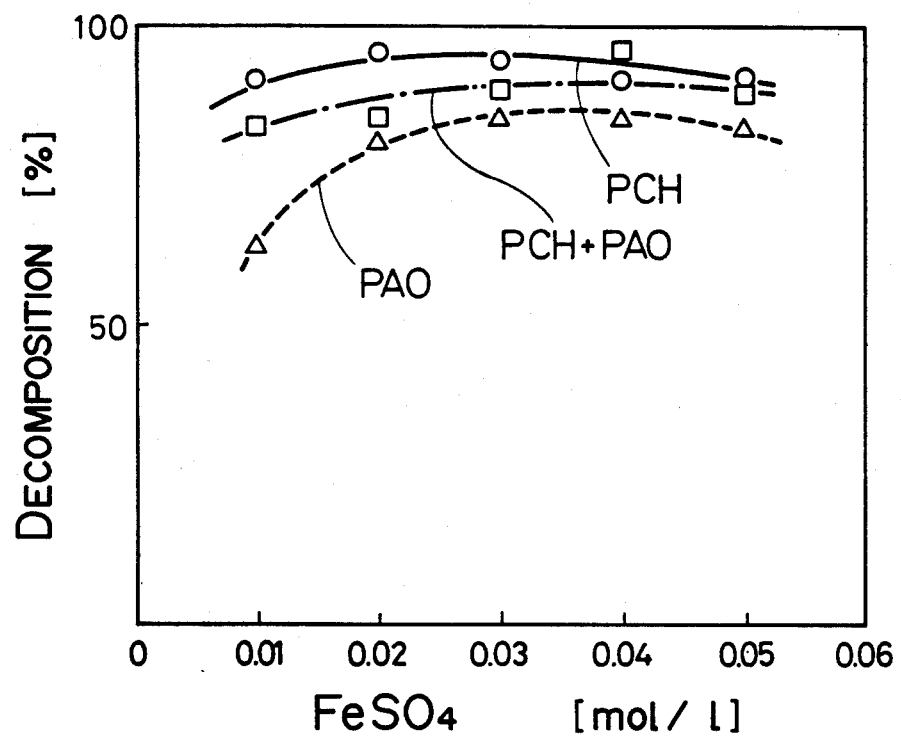

4,624,792

METHOD FOR TREATING RADIOACTIVE ORGANIC WASTES

BACKGROUND OF THE INVENTION

1. Field of the Invention

The present invention relates to an improved method for treating radioactive organic wastes by a wet-type oxidative decomposition process.

2. State of the Art

Waste water occurring in nuclear power plants or laboratories handling radioactive substances is disposed after being filtered and treated with ion-exchange resins. It is necessary to treat the radioactive spent filter sludge and spent ion-exchange resin for safe disposal thereof.

To date, the proposed methods for volume-reducing this kind of radioactive organic waste, include dry processes as incineration and thermal decomposition, and wet processes as acid digestion and the so-called Zimmerman Process. All of the known methods have obstacles, which prevent their commercial practice.

The incineration method inevitably generates a large amount of corrosive exhaust gas, which thereby requires a large scale treating system. Further, additional problems remain to be solved before applying this method to the radioactive waste.

The thermal decomposition method is advantageous due to the easy treatment of the exhaust gas because only a small amount of radioactive nuclear species transfers to the decomposed gas. However, the entire process is complex since treatment of the decomposed gas requires a combination with the incineration method.

The acid digestion method using concentrated sulfuric acid has an advantage in that, a major portion of the radioactive substances remains in liquid, thereby making it easy to treat the exhaust gas. The objectionable feature is that the method suffers from severe corrosion of the apparatus necessitating expensive material for the apparatus, such as tantalum.

The Zimmerman Process has the same advantage, though precautionary measures for ensuring safety under the operation conditions of high pressure and high temperature are necessary.

Utilization of the hydrogen peroxide aqueous solution for treating the spent cation-exchange resin has been attempted with reported results that show ferric ion $Fe^{3+}$ takes the role of a catalyst to promote this oxidative decomposition reaction (See the report "Decomposition of Ion-Exchange Resins with Hydrogen Peroxide" by Kubota et al. for The Japan Association of Nuclear Power held on Mar. 28, 1981). This catalytic oxidative decomposition is, however, not as useful when applied to the treatment of an anion-exchange resin because decomposition thereof does not readily proceed.

SUMMARY OF THE INVENTION

The object of the present invention is to provide an improved method for treating radioactive organic wastes, which retains the major advantage of the wet process, where the exhaust gas is easily treated, and is free from difficulties, such as possible explosion.

The above object can be achieved in accordance with the present invention by decomposing radioactive organic wastes containing at least one of an anion-exchange resin, a chelate resin and an organic filter sludge by oxidizing them with hydrogen peroxide in an aqueous medium in the presence of iron-ions, i.e. at least a ferrous ion or a ferric ion.

The above object can be advantageously achieved in accordance with the preferable embodiment of the present invention in which the hydrogen peroxide, or both the hydrogen peroxide and the organic wastes are continuously fed to the reaction system.

We have discovered that organic wastes other than ion-exchange resins, for example, chelate resin and organic filter sludge such as cellulosic filter sludge, may be readily oxidatively decomposed with hydrogen peroxide in the presence of iron-ions ($Fe^{2+}$ and/or $Fe^{3+}$). Also we have discovered that, in spite of the traditional understanding that oxidative decomposition of the anion-exchange resin with hydrogen peroxide is difficult, even if an iron-ion is present, the oxidative decomposition of the anion-exchange resins readily proceeds if there is a certain amount of the cation-exchange resin. Promotion of the oxidative decomposition of the organic wastes, by a cation-exchange resin, is also effective on the chelate resin and the organic filter sludge.

Further study revealed that the oxidative decomposition may be carried out more advantageously in commercial practice by continuously feeding hydrogen peroxide or both hydrogen oxide and the organic wastes to the reaction system. This advantageous operation established the present invention.

BRIEF EXPLANATION OF DRAWING

The attached drawing is a graph showing the relationship between the concentration of $Fe^{2+}$ ion and the decomposition percentage of the TOC (total organic carbon) in the oxidative decomposition of the organic wastes according to the present invention.

DETAILED DESCRIPTION OF PREFERRED EMBODIMENTS

The method for treating the radioactive organic wastes with the present invention basically comprises decomposing by oxidizing the radioactive organic wastes containing at least one of an anion-exchange resin, a chelate resin and an organic filter sludge with hydrogen peroxide in an aqueous medium in the presence of at least a ferrous ion or a ferric ion, or both the iron-ion and cation-exchange resin.

A typical embodiment of the present invention comprises, in the above process comprising decomposing by oxidizing the radioactive organic solid wastes containing at least one of an anion-exchange resin, a chelate resin and an organic filter sludge with hydrogen peroxide in an aqueous medium in the presence of at least a ferrous ion or a ferric ion, or both the iron-ion and cation-exchange resin, continuously adding the hydrogen peroxide aqueous solution of a concentration from 30 to 60% by weight in the form of liquid, or after being changed to gas, to the wastes to be decomposed at a rate of 2 to 40 gr/hour per 1 gr of the wastes (dry basis).

This embodiment is preferably carried out so that hydrogen peroxide, as well as the wastes, are continuously fed to the reaction zone at a feeding rate of 1 to 20 gr/hour for the hydrogen peroxide aqueous solution per 1 gr/hour of the wastes to be decomposed.

The iron-ions may be present as ferrous, $Fe^{2+}$, or ferric, $Fe^{3+}$, or a mixture thereof.

An effective concentration of ions is 0.01 mole/liter or more in the aqueous medium. A concentration higher than 0.05 mole/liter is unnecessary and, even less effective. It has been found that the effect does not depend on the concentration in this range.

As the source of the iron-ions, any of the soluble iron salts may be used. For example, $FeSO_4$, $Fe(NH_4)_2 Fe(SO_4)_2$, $Fe Cl_2$, $Fe(CH_3CHOHCOO)_2$ and $FeC_2O_4$ provide $Fe^{2+}$ ions. $Fe_2(SO_4)_3$, $Fe(NO_3)_3$, $FeCl_3$ and $(NH_4)_2 Fe_2(SO_4)_4$ are examples which provide $Fe_{3+}$ ions. To minimize apparatus corrosion, the compounds containing Cl are not preferred, and ammonium salts may cause gas evolution problems. According to our experience, organic salts seem to have a lower catalytic effect, thus, preferable compounds of iron-ions source are $FeSO_4$, $Fe_2(SO_4)_3$ and $Fe(NO_3)_3$.

The cation-exchange resin has appreciable effects if it is present in an amount of at least 1% by weight of the other organic wastes. Remarkable decomposition effect of organic wastes is observed when it is present in an amount of 10% or more. In practice, spent cation-exchange resin and spent anion-exchange resin occurs at the same time as the organic wastes from nuclear power facilities, and they may be treated together.

The present method may be applied for treating radioactive liquid wastes containing oil or surfactant as well as the above noted anion-exchange resin, chelete resin and organic filter sludge.

The hydrogen peroxide aqueous solution may be used, as noted above, in the form of either liquid or gas. If the concentration of hydrogen peroxide is too low, more heat is required for liquid accompanied with hydrogen peroxide to evaporate. However, if too high of a concentration is used, operation and handling may become dangerous. As a compromise, a concentration in the range of 30 to 60% by weight should be used.

The pH of the reaction system has been found to have little influence on the reaction rate when in the range from 1 to 10. In order to avoid corrosion of the apparatus, a pH of 1.5 or higher should be used.

The oxidative decomposition proceeds quickly at a temperature of about 70° C. or higher. Because the reaction is exothermic, it is not necessary to heat the system after the reaction is initiated, but if necessary, a little heat may be applied. Where no pressure is supplied, the reaction continues at a temperature near the boiling point of the aqueous medium, i.e. about 100° C. A higher temperature under pressure can of course be used. However, one of the merits of the present invention is that the process may proceed under normal pressure. Operation with a high pressure is not advantageous.

The rate which hydrogen peroxide is fed must not be too slow because the completed reaction period necessary will become too prolonged. The minimum rate is about 2 gr/hour per 1 gr (dry weight basis) of the wastes to be decomposed. Too high of hydrogen peroxide rate will not have a large effect on the oxidation but hydrogen peroxide will ineffectively decompose. Hence, a rate up to 40 gr/hour is preferable.

In the embodiment where the organic wastes to be decomposed are continuously fed in addition to the hydrogen peroxide, the wastes are continuously fed at a rate of 1 to 20 gr/hour of hydrogen peroxide per 1 gr of wastes. In this case, it is preferable to use in the reaction system a range from 1 to 10% by weight. The average residence time in the system is preferably 2 to 6 hours.

In any embodiments described above, it is recommended for the oxidative decomposition to feed the hydrogen peroxide aqueous solution (even if changed to gas) from the bottom of the vessel so that stirring of the reaction system may be enhanced.

The products of the oxidative decomposition of organic wastes using hydrogen peroxide are mainly carbon dioxide gas and water, which are quite harmless. This means that the present process fully enjoys the merits of the wet process which is free from exhaust gas treatment problems. Further, the reaction proceeds under mild condition of normal pressure and a temperature of 70° to 100° C., and requires no particular heating means. The apparatus for employing the process may be made with ordinary materials because of little possibility of corrosion. Thus the apparatus can be constructed at a lower cost, and may be operated very safely.

The continuous feeding of hydrogen peroxide requires a vessel of a smaller volume capacity. This merit is even more significant when not only the hydrogen peroxide solution but also the wastes to be decomposed are continuously and simultaneously fed.

In the preferable embodiment where the hydrogen peroxide solution is fed from the bottom of the reaction vessel, a stirring is obtained from the ascent of the material fed. Bubbling of oxygen then occurs due to the decomposition of hydrogen peroxide. Thus, it is not necessary to equip a stirrer inside the reaction vessel or circulating pump outside of the vessel. This is an important advantage in handling radioactive materials.

The above noted merits will be understood from the following examples.

EXAMPLE I

In the aqueous solution of 50 ml in which $FeSO_4 \cdot 7H_2O$ or $Fe(NO_3)_3 \cdot 9H_2O$ is dissolved, in an amount where the concentration of $Fe^{2+}$ or $Fe^{3+}$ is 0.02M, powder of various ion-exchange resins is dispersed. This liquid is heated to 80° C., with 30% hydrogen peroxide added while stirring.

The 30% hydrogen peroxide solution is necessary for complete dissolution of the suspended resins and decrease of TOC (total organic carbon) as shown in Table 1.

The ion-exchange resins tested are as follows, and noted with references in Table 1.

|  | Cation-Exchange Resins | Anion-Exchange Resins |
| --- | --- | --- |
| Powdex | PCH | PAO |
| Amberbite | IR-120B | IRA-400 |
| Amberlite | 200C | IRA-900 |
| Diaion | SKN-1 | SAN-1 |

From the data in Table 1, it is understood that presence of a cation-exchange resins facilitates treatment of the anion-exchange resins, which alone are not easily oxidized and decomposed.

TABLE 1

| No. | Kind of Resins | Amount of Resins (g) | Iron Ion | Hydrogen Peroxide | Decrease of TOC (%) |
| --- | --- | --- | --- | --- | --- |
| (Cation-Exchange Resin alone) | | | | | |
| 1 | PCH | 1 | $Fe^{2+}$ | 11 | 74 |
| 2 | PCH | 1 | $Fe^{3+}$ | 13 | 77 |
| 3 | IR-120B | 1 | $Fe^{2+}$ | 13 | 73 |
| 4 | 200C | 1 | $Fe^{2+}$ | 24 | 83 |
| 5 | 200C | 1 | $Fe^{3+}$ | 30 | 82 |
| 6 | SKN-1 | 1 | $Fe^{2+}$ | 11 | 75 |
| (Anion-Exchange Resin alone) | | | | | |
| 7 | PAO | 1 | $Fe^{2+}$ | 63 | 45 |
| 8 | PAO | 1 | $Fe^{3+}$ | 75 | 44 |
| 9 | IRA-400 | 1 | $Fe^{2+}$ | 85 | 69 |

TABLE 1-continued

| No. | Kind of Resins | Amount of Resins (g) | Iron Ion | Hydrogen Peroxide | Decrease of TOC (%) |
|---|---|---|---|---|---|
| 10 | IRA-900 | 1 | $Fe^{2+}$ | 74 | 65 |
| 11 | IRA-900 | 1 | $Fe^{3+}$ | 89 | 63 |
| 12 | SAN-1 | 1 | $Fe^{2+}$ | 40 | 74 |
| | (Resins Mixed) | | | | |
| 13 | PCH PAO | 0.44 1 | $Fe^{3+}$ | 28 | 74 |
| 14 | IR-120B IRA-400 | 0.33 1 | $Fe^{2+}$ | 26 | 77 |
| 15 | 200C IRA-900 | 0.34 1 | $Fe^{2+}$ | 24 | 77 |
| 16 | SKN-1 SAN-1 | 0.55 1 | $Fe^{2+}$ | 28 | 71 |

EXAMPLE 2

In order to determine the influence of the $Fe^{2+}$ ion concentration in an aqueous medium on the TOC-decomposition during the oxidative decomposition, the above noted cation-exchange resin and anion-exchange resin, Powdex PCH and PAO, respectively, were used alone and as a mixture, and the concentration of $Fe_2SO_4 7H_2O$ was varied from 0.01 to 0.05M.

The results shown in the attached drawing illustrate that the TOC decomposition value is efficient at 0.01 to 0.02M of $Fe^{2+}$. Slight concentration increases, up to 0.05M does not substantially improve the TOC decomposition therefore, the maximum recommended $Fe^{2+}$ value is 0.02M, showing the highest TOC decomposition.

EXAMPLE 3

For the purpose of determining the promotion of the oxidative decomposition by the cation-exchange resins 0.1 gr was mixed with 1 gr or the following organic materials, and the mixture was oxidatively decomposed under the same condition as those of Example 1.

(Anion-Exchange Resins)

Powdex PAO, Diaion SAN-1

(Chelate Resin)

UR-30

(Organic Filter Sludges)

KC Floc W-50, Solca Floc BW-40

Necessary amounts of the 30% hydrogen peroxide solution and TOC percentage decrease of organic wastes in the reaction vessel are shown in Table 2. For the purpose of comparison, the data in the parenthesis represent cases where no cation-exchange resin was added.

TABLE 2

| No. | Organic Materials | Cation-Exchange Resin | Hydrogen Peroxide (ml) | TOC Decrease (%) |
|---|---|---|---|---|
| 1 | PAO | PCH | 30 | 76 |
| | | (no) | (90) | (72) |
| 2 | SAN-1 | SLN-1 | 40 | 95 |
| | | (no) | (130) | (86) |
| 3 | UR-30 | IR-120B | 100 | 73 |
| | | (no) | (135) | (72) |
| 4 | W-50 | IR-120B | 90 | 93 |
| | | (no) | (120) | (95) |
| 5 | BW-40 | IR-120B | 100 | 96 |
| | | (no) | (127) | (95) |

EXAMPLE 4

In the aqueous solution of 50 ml in which $FeSO_4.7H_2O$ or $Fe(NO_3)_3.9H_2O$ is dissolved in an amount where concentration of $Fe^{2+}$ or $Fe^{3+}$ is 0.02M, powder of various anion-exchange resins, chelate resins or filter sludge, each of 1 gr were dispersed with 0.2 gr of cation-exchange resin (Amberlite IR-120B). The dispersions were heated to 80° C., and the 35% hydrogen peroxide solution was added thereto in batches and continuously, the former with stirring and the latter without stirring.

The amount of the 35% hydrogen peroxide solution, necessary for the complete dissolution of the resins, is shown in Table 3 where the batch feeding (entire amount at once) and the continuous feeding (rate at being 23.7 gr/hour) are compared. As shown, smaller amounts of hydrogen peroxide are needed in the continuous process than in the batch process.

TABLE 3

| Resins | 35% Hydrogen Continuous | Peroxide Batch |
|---|---|---|
| (Anion-Exchange Resins) | | |
| Powdex PAO | 18 | 100 |
| Amberlite IRA-400 | 27 | 100 |
| Diaion | 15 | 100 |
| Amberlite IRA-900 | 17 | 100 |
| (Chelate Resins) | | |
| Uniselex UR-50 | 30 | 100 |
| (Filter Sludges) | | |
| KC Floc | 25 | 100 |
| Solca Floc | 42 | 100 |

EXAMPLE 5

The $Fe^{2+}$ catalyst was added to a slurry of granular ion-exchange bead resins (mixture of 2 gr of Diaion SK 1B and 2 gr of Diaion SA 10A) in 150 ml of water in such an amount that the concentration of $Fe^{2+}$ is 0.01M.

The slurry and the 35% hydrogen peroxide aqueous solution were continuously fed to a column-type reactor at feeding rates of 35 ml/hour and 14 ml/hour, respectively, to conduct the oxidative decomposition at a temperature of 100° C. and an average residence time of 5 hours.

Attained was a 98% decomposition rate.

EXAMPLE 6

In the system in which 1 gr each of the cation-exchange resin IR-120B and the anion-exchange resin IRA-400 are dispersed in 50 ml of water, concentration of the $Fe^{2+}$ catalyst was determined at 0.02M, with the 35% hydrogen peroxide aqueous solution was continuously fed at the rate of 60 ml/hour with independent pH values.

The conversion depending on the lapse of time was determined at various pH values. The results are shown in Table 4, from which it is understood that pH has little influence on the reaction rate.

TABLE 4

| | pH = | | | |
|---|---|---|---|---|
| | Conversion (%) | | | |
| Time (min.) | 1 | 4 | 7 | 10 |
| 50 | 84 | 94 | 94 | 89 |
| 60 | 87 | 96 | 96 | 94 |
| 90 | 91 | 99 | 99 | 97 |

TABLE 4-continued

| Time (min.) | pH = Conversion (%) | | | |
| --- | --- | --- | --- | --- |
| | 1 | 4 | 7 | 10 |
| 120 | 93 | 99 | 99 | 98 |
| 150 | 95 | 100 | 100 | 99 |

EXAMPLE 7

The 35% hydrogen peroxide solution was added to the dispersion of 10 gr of the cation-exchange resin, IR-120B. This IR-120B concentration in water was 10% of the total water volume.

The batch process required the 400 to 600 ml capacity reaction vessel to be safe against possible vigorous foaming during the reaction, while the vessel volume capacity of 200 ml was sufficient for the continuous process.

EXAMPLE 8

Twenty gr of the organic filter sludge KC Floc was dispersed in 50 ml of water, and the 35% hydrogen peroxide solution was continuously fed to the dispersion at a rate of 160 ml/hour to oxidatively decompose the filter sludge. The percentage decrease in the TOC was determined, after 2 hours and 30 minutes, to be 98% with mechanical stirring, and 93% without mechanical stirring.

We claim:

1. A method for treating radioactive organic wastes containing anionic exchange resins which comprises decomposing the wastes by oxidizing treatment with at least 2 gr/hour of hydrogen peroxide per gr of waste at a temperature below 100° C. with a catalyst system comprising (a) salts containing ferrous or ferric ions at a concentration of 0.01 to 0.05 moles per liter and (b) an organic cation exchange resin in an amount of at least 1% by weight based on the organic solid wastes to be decomposed.

2. A method for treating radioactive organic wastes according to claim 1 wherein hydrogen peroxide is continuously fed, as an aqueous solution with a concentration from 30 to 60% by weight, in the form of liquid, or after being changed to gas, at a rate of between 2 and 40 gr/hour per 1 gr(dry basis) of the wastes to be decomposed, to an aqueous medium in the presence of both an iron-ion and a cation-exchange resin.

3. A method according to claim 2 in which the continuous decomposition by oxidation of the wastes is carried out at a waste concentration of from 1 to 10% (w/v).

4. A method according to claim 1 in which the amount of the cation-exchange resin is 10% or more by weight, based on the organic solid wastes to be decomposed.

5. A method according to claim 1, in which the oxidative decomposition reaction is carried out in an aqueous medium with a pH value ranging from 1.5 to 10.

6. A method according to claim 1, in which the oxidative decomposition reaction is promoted by stirring with hydrogen peroxide, which is fed from the bottom of the reaction vessel.

* * * * *